United States Patent [19]

Biberstine et al.

[11] Patent Number: 5,676,460

[45] Date of Patent: Oct. 14, 1997

[54] HINGED SAFETY RAIL FOR A CONCRETE MIXING TRUCK

[75] Inventors: Daniel S. Biberstine, Wolcottville; Paul C. Ellingen, Churubusco; Steven K. Igney, Fort Wayne, all of Ind.

[73] Assignee: Advance Mixer, Inc., Fort Wayne, Ind.

[21] Appl. No.: 708,210

[22] Filed: Sep. 6, 1996

[51] Int. Cl.⁶ .................. B01F 15/02; B28C 5/00; E04G 27/00
[52] U.S. Cl. .................. 366/54; 366/349; 182/113
[58] Field of Search .................. 366/1, 41, 54, 366/68, 349, 53; 182/113

[56] References Cited

U.S. PATENT DOCUMENTS

| | | | |
|---|---|---|---|
| 2,196,511 | 4/1940 | Wagner et al. | 182/113 |
| 2,753,224 | 7/1956 | Troche et al. | 182/113 |
| 2,888,299 | 5/1959 | Balogh | 182/15 |
| 3,072,215 | 1/1963 | Rush | 182/2 |
| 3,648,720 | 3/1972 | Kornahrens | 137/351 |
| 3,693,754 | 9/1972 | Butler | 182/86 |
| 3,905,449 | 9/1975 | Uphoff | 182/113 |
| 4,009,868 | 3/1977 | Blind | 366/68 |
| 4,214,849 | 7/1980 | Downing | 414/545 |
| 4,371,056 | 2/1983 | Anglade | 182/113 |
| 4,482,284 | 11/1984 | Robbins et al. | 414/539 |
| 4,520,898 | 6/1985 | Allemane | 182/113 |
| 4,620,612 | 11/1986 | Enoki et al. | 182/113 |
| 4,802,141 | 1/1989 | Stegemoeller et al. | 366/53 |
| 4,886,282 | 12/1989 | Wilkinson | 280/4 |
| 5,143,449 | 9/1992 | Faccia | 366/349 |
| 5,213,367 | 5/1993 | Norman, Jr. | 182/113 |

FOREIGN PATENT DOCUMENTS

| | | | |
|---|---|---|---|
| 3011867 | 5/1981 | Germany | 366/41 |
| 3523098 | 1/1987 | Germany | 366/54 |
| 478509 | 2/1953 | Italy | 366/68 |

*Primary Examiner*—Tony G. Soohoo
*Attorney, Agent, or Firm*—Baker & Daniels

[57] ABSTRACT

A concrete mixing truck having an apparatus for mixing materials used to make concrete includes a mixing product receiving and delivery assembly, a platform, which is located proximate the mixing product receiving and delivery assembly for providing operator access thereto, and a repositionable safety rail. The safety rail is located on and partially encloses the platform and is positionable, via a hinge or other suitable means, between an upraised position and a lowered position. With the safety rail in the upraised position, an operator present on the platform is provided with an added measure of safety to prevent against accidental falling and resulting injury. With the safety rail in a lowered position, the platform is essentially inaccessible to operators and the mixing product receiving and delivery assembly is unobscured and completely accessible to machinery such as associated with a ready-mix concrete plant.

26 Claims, 2 Drawing Sheets

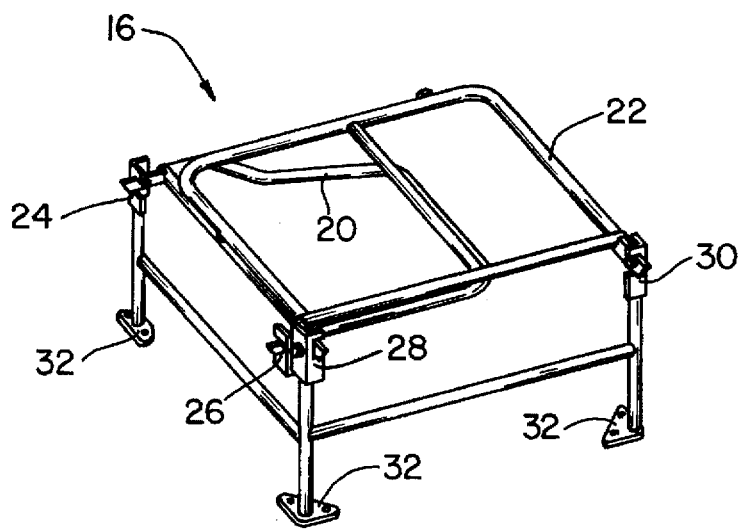
FIG. 2C
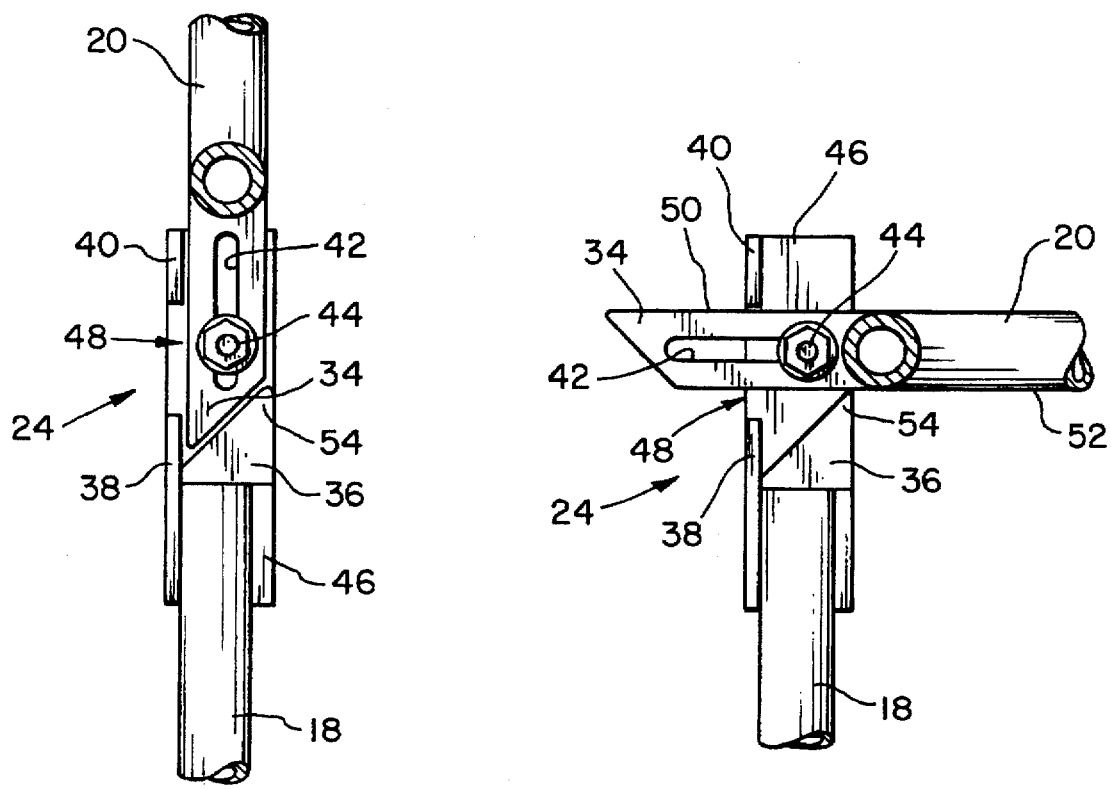
FIG. 3A
FIG. 3B

HINGED SAFETY RAIL FOR A CONCRETE MIXING TRUCK

BACKGROUND OF THE INVENTION

The present invention relates to concrete trucks having an apparatus for mixing the constituents, and, more particularly, to platform safety rails provided on such mixing trucks. Mixing trucks include a mixing product delivery and receiving structure which is elevated above the ground. In the case of a front loaded truck, the mixing product delivery and receiving structure typically includes a charge hopper for receiving mixing product from a ready-mix concrete plant, and a collection hopper which serves as a point of distribution for mixed concrete. Generally the mixing product received by the charge hopper comprises sand, stone, cement, and water. These materials are introduced through the top of the charge hopper and into the mixing drum where they are mixed together in a rotating fashion. Generally a ladder is required to reach the mixing product delivery and receiving structure and a platform is provided for operator convenience.

After delivering concrete to a site, it is necessary to thoroughly clean the collection hopper and the surrounding area before the spilled concrete sets. An operator must gain access to the platform in order to effectively clean the collection hopper. As the platform is elevated a distance above the ground, accidental injury will occur if a mixing operator falls from the platform onto the truck or to the ground. Accordingly, safety rails have been implemented as an added safety measure to prevent against such accidental injury.

During normal operation, loading, clean-up, and servicing of the mixing truck, machinery is used to deliver product to the mixing drum or barrel of the mixing truck. Typically, materials for making concrete are delivered to a concrete mixing truck from a ready-mix concrete plant. The mixing truck is maneuvered into a delivery bay or structure which includes overhanging structure and machinery used in the delivery process. Safety rails often prevent the proper positioning of the mixing truck in the concrete delivery plant and obstruct outside access to the mixing product delivery and receiving structure. This greatly complicates the delivery of concrete mixing materials. Accordingly, it is desirable for the ready-mix concrete plant and its associated machinery to have unfettered access to the mixing product receiving structure for effective operation.

Therefore, a problem with previous safety rails is that often such rails are rigid in design and, in order to effectively achieve their safety goals, are of such a height, usually about 42 inches, to obscure the mixing product receiving structure from the ready-mix concrete plant structure.

Another problem with rigid safety rails is that they often get tangled in tree limbs when the mixing truck is driven into wooded areas. Such entanglement can result in damage to trees and to the truck. What is needed is a safety rail that can avoid rail entanglement in wooded areas.

SUMMARY OF THE INVENTION

The present invention provides a repositionable safety rail for use on a platform of a mixing truck. The safety rail may be repositioned, such as by a hinge or other suitable means, between an upraised position and a lowered position. With the safety rail of the present invention in the upraised position, an operator occupying the platform area of the mixing truck is provided an added measure of safety to prevent accidental falling and resulting injury. The safety rail of the present invention locks into place when placed in the upraised position so that an operator may lean against the safety rail and the rail will not give or collapse and will stay in the upraised position until repositioned. In normal operation, the safety rail should be maintained in the upraised position and should only be repositioned to the lower position when necessary to provide greater access to the mixing product receiving structure or to avoid entanglement in wooded areas. Should certain regulatory requirements, such as the Occupational Safety and Health Act, apply to ready-mix concrete mixing trucks, then the safety rail of the present invention would comply with all such regulations. For example, if the height requirement for safety rails is 42 inches, then the height of the safety rail, when in the upraised position, should be at a minimum 42 inches. Further, should regulations require the use of a toe board having a minimum height at the foot of the safety rail, then such a toe board should be implemented with the present invention safety rail.

The elevated mixing product receiving and delivery structure of the mixing truck interfaces with machinery during normal operation and servicing. To provide the needed access required by such machinery, the safety rail of the present invention is repositionable from the upraised position, from which the mixing product receiving and delivery structure is somewhat obscured, to the lowered position, thereby providing unobscured accessibility. Further, with the safety rail in the lowered position, operator accessibility to the platform area is substantially reduced. In a preferred embodiment, the operator must reposition the safety rail from the lowered position to the upraised position to gain access to the platform. This prevents an operator from simply leaving the safety rail in the lowered position at all times and negating the safety measure.

The invention comprises, in one form thereof, a cement mixing truck having a mixing drum, a mixing product receiving and delivery assembly adjacent an elevated platform, and a safety rail partially enclosing the elevated platform. The safety rail extends from the platform and includes a repositionable portion. The repositionable portion is repositionable between a lowered position and a locked upraised position. With the safety rail in the locked upraised position a measure of safety is provided to a person occupying the platform and with the safety rail in the lowered position, the mixing product receiving and delivery assembly is unobscured and accessible.

The invention also provides, in one form thereof, a cement mixing truck having a mixing drum with an opening for receiving a product to be mixed, a mixing product receiving and delivery assembly adjacent the opening, an elevated platform in close proximity with the mixing product receiving and delivery assembly, and a safety rail. The safety rail includes a stationary support, a foldable rail, and a device for repositioning the foldable rail. The stationary support has a bottom end and a top end, and is fixably attached to the platform at the bottom end. The device for repositioning the foldable rail is located intermediate the stationary support and foldable rail, and permits the repositioning of the foldable rail with respect to the stationary support from an upraised position to a lowered position. With the foldable rail in the lowered position, the mixing product receiving and delivery assembly and the drum opening are unobscured and accessible.

An advantage of the present invention is added versatility in achieving both enhanced safety measures and enhanced accessibility to the mixing product receiving and delivery area of a mixing truck.

Another advantage is a safety measure which inherently requires its implementation by an operator.

Yet another advantage is with the safety rail in the lowered position, snagging and entanglement of the rail with tree limbs or other obstacles is greatly reduced.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 2C is a perspective view of the safety rail of FIG. 1 with the two foldable rails in the lowered position.

FIG. 3A is a front view of a hinge and lock mechanism, located intermediate the foldable rail and stationary support of FIG. 1, with the safety rail in the upraised position.

FIG. 3B is a front view of the hinge and lock mechanism of FIG. 3A with the safety rail in the lowered position.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
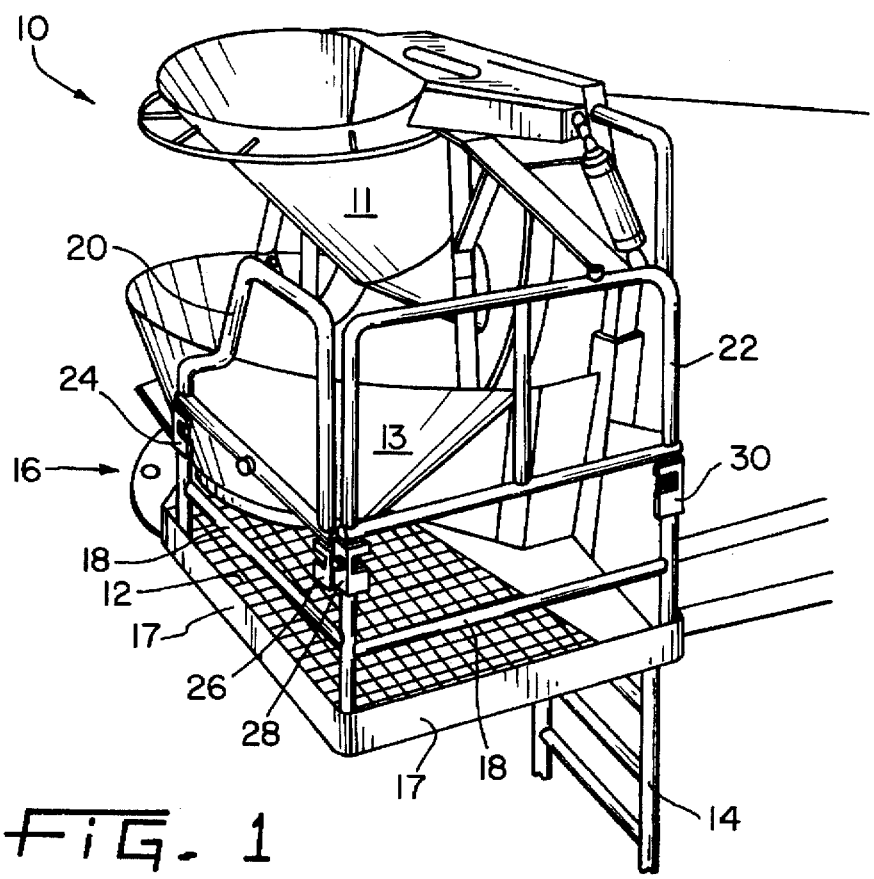
FIG. 1 is a perspective view of the safety rail of the present invention on a platform of a mixing track and in an upraised position.
Figure 2A:
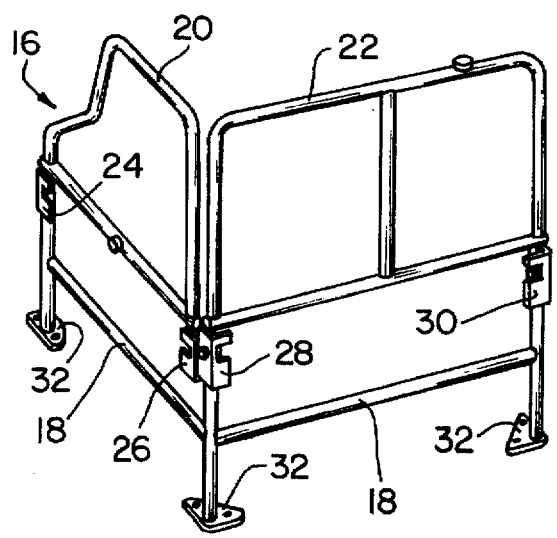
FIG. 2A is a perspective view of the safety rail of FIG. 1 with two foldable rails in the upraised position.

Referring now to the drawings and particularly to FIG. 1, there is shown a mixing product receiving and delivery structure, referenced generally at 10 and comprising charge hopper 11 and collection hopper 13, which is part of a mixing truck (not shown). Charge hopper 11 receives mixing product, such as sand, cement, stone, and water, from a ready-mix concrete plant. Collection hopper 13 serves as a point of distribution for concrete mixed in the mixing drum (not shown) of the mixing truck. In close proximity to structure 10 is platform 12 which is also attached to the mixing truck. Platform 12 and structure 10 are elevated from ground level and ladder 14 is provided on the mixing truck to provide operator access to platform 12 and structure 10. During normal operation it often becomes necessary for an operator to occupy platform 12 to perform work around structure 10. As a measure of safety to guard against accidental falling from platform 12, a safety rail assembly, denoted generally at reference numeral 16, is provided on platform 12. Safety rail assembly 16 includes stationary support 18, foldable rails 20 and 22, and hinge and lock mechanisms 24, 26, 28 and 30. Stationary support 18 extends vertically from platform 12 and is attached thereto by anchors 32. Toe board 17 extends upward from platform 12, preferably about four inches, along stationary support 18 to protect against tools or other objects from being accidentally knocked off of the platform. FIGS. 1 and 2A illustrate rail assembly 16 in an upraised position with foldable rails 20 and 22 extending vertically upward from stationary support 18. With an operator standing on platform 12, as a matter of safety and as a matter of operational necessity, safety rail assembly 16 will be in an upraised position.

While servicing, loading or cleaning the mixing truck, it is often necessary for service equipment or machinery to engage or otherwise interact with structure 10. In particular, the mixing truck must be positioned in a ready-mix concrete plant to receive mixing products into charge hopper 11. Typically the ready-mix concrete plant has overhead structure and machinery which are obstructed by safety rails. Accordingly structure 10 must be made accessible to such machinery for effective loading, servicing and cleaning. To address this concern, safety rail assembly 16 is capable of being folded down from the upraised position to a lowered position to allow access to structure 10. In the process of vacating platform 12, an operator can reposition foldable rails 20 and 22 from a raised position to a lowered position as illustrated in FIGS. 2A through 2C and 3A through 3B and as discussed hereinbelow.

With safety rail assembly 16 in an upraised position, foldable rails 20 and 22 rest upon and are supported by stationary support 18 in conjunction with the hinge and lock mechanisms. As shown in FIG. 3A, foldable rail 20 is provided with an angled end 34 which rests upon and is supported by angled rest 36, lower flange 38 and upper flange 40 of hinge and lock mechanism 24, which is mounted on stationary support 18. This is an over-center type of locking arrangement whereby foldable rail 20, once raised to a vertical position, may be lowered axially downward into a locked vertical position. Elongated slot 42 is provided adjacent angled end 34 of foldable rail 20 and slidably receives fixed member 44 which is attached to hinge bracket 46. An operator may reposition foldable rail 20 from an upraised position to a lowered position by lifting up on foldable rail 20 in a direction away from stationary support 18 such that angled end 34 becomes clear and free of angled rest 36 and lower flange 38. Once lower end 34 is clear and free of flange 38 foldable rail 20 may be pivoted inward toward platform 12 until coming to rest in a substantially horizontal position as shown in FIG. 3B. Once foldable rail 20 is pivoted to this horizontal lowered position, angled end 34 extends through opening 48 formed between lower flange 38 and upper flange 40 and engages upper flange 40 along surface 50. Also with foldable rail 20 in the horizontal lowered position, opposite surface 52 engages angled rest 36 at point 54. Fixed member 44 is loosely received in slot 42 thereby permitting both axial and pivotal movement of foldable rail 20 relative stationary support 18.

Figure 2B:
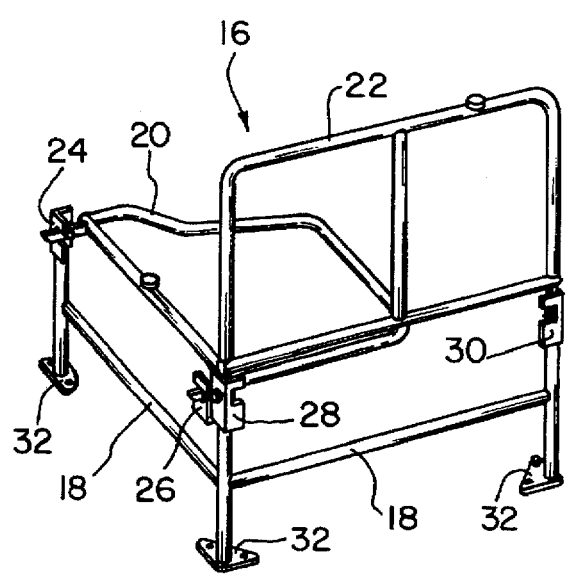
FIG. 2B is a perspective view of the safety rail of FIG. 1 with one of the two foldable rails in the upraised position and the other of the two foldable rails in a lowered position.

FIG. 2B illustrates foldable rail 20 in the lowered position with hinge and lock mechanisms 24 and 26 as shown in FIG. 3B and as described above. For clearance purposes hinge and lock mechanisms 28 and 30 are mounted to stationary support 18 at a position slightly above hinge and lock mechanisms 24 and 26. The spatial difference between the two pairs of hinge and lock mechanisms should be sufficient to provide ample clearance for foldable rail 22 as it is pivoted from a raised position to a lowered position on top of and adjacent foldable rail 20, as shown in FIG. 2C. The method for pivoting foldable rail 22 into a lower position is as described above for foldable rail 20.

With rail assembly 16 in a lowered position as shown in FIG. 2C, foldable rails 20 and 22 are parallel to and spatially separated from platform 12. In the lowered position, safety rail assembly 16 renders platform 12 substantially inaccessible to an operator. Accordingly, to regain access to platform 12 an operator must raise foldable rails 20 and 22 to an upright, essentially vertical position. With rail assembly 16 in a lowered position, structure 10 is generally unobstructed and accessible to structure and machinery, such as at a ready-mix concrete plant, for servicing, loading, cleaning or otherwise. Although rail assembly 16 is illustrated in a preferred embodiment having a particular hinge and lock mechanism intermediate the stationary support and the foldable rail, any known means for positioning the safety rail from a locked upraised position to a lowered position is fully contemplated by the present invention. For example, in place of the hinge mechanisms disclosed herein, a receiving tube arrangement may be utilized. One set of receiving tubes can receive tubular members of the foldable rails for effecting a horizontal rail position. Another set of receiving tubes, angularly spaced 90 degrees apart from the first set, can receive the tubular members of the foldable rails so as to effect a vertical rail position.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A cement mixing truck having a mixing drum, a mixing product receiving and delivery assembly connected to said mixing drum, an elevated platform adjacent said mixing product receiving and delivery assembly, and a safety rail partially enclosing said platform and having a portion repositionable between a locked upraised position and a lowered position, whereby with said safety rail in said locked upraised position a person occupying said platform is provided a measure of safety and with said safety rail in said lowered position said mixing product receiving and delivery assembly is unobscured and accessible.

2. The cement mixing truck of claim 1, wherein in said locked upraised position, said repositionable portion is substantially vertical and in said lowered position said repositionable portion is substantially horizontal.

3. The cement mixing truck of claim 1, wherein said safety rail comprises a hinge connected to said repositionable portion, whereby said repositionable portion is pivoted with respect to said platform between said locked upraised position and said lowered position.

4. The cement mixing truck of claim 1, wherein said safety rail comprises a vertical stationary support and said repositionable portion is a foldable rail, one end of said stationary support is attached to said platform and an opposite end of said stationary support is attached to said foldable rail.

5. The cement mixing truck of claim 4, wherein said safety rail comprises a hinge disposed intermediate said stationary support and said foldable rail, whereby said foldable rail is pivoted with respect to said stationary support between said locked upraised position and said lowered position.

6. The cement mixing truck of claim 5, wherein said hinge comprises a fixed member attached to one of said stationary support and said foldable rail, and a slot in the other of said stationary support and said foldable rail for slidably receiving said fixed member.

7. The cement mixing truck of claim 6, wherein said safety rail comprises a stop, said foldable rail engages said stop when in said locked upraised position and is foldable inwards toward said platform to said lowered position, and in said lowered position, said foldable rail includes a portion which is spaced from said platform, thereby making the area of said platform directly underneath said foldable rail substantially inaccessible to persons.

8. The cement mixing truck of claim 7, wherein said safety rail comprises a second stop, said foldable rail engages said second stop when in said lowered position, and said foldable rail is spaced from and generally parallel with said platform when in said lowered position.

9. The cement mixing truck of claim 4, wherein said safety rail comprises a bracket disposed intermediate said stationary support and said foldable rail, said bracket includes a first flange, a second flange, and an angled rest, said foldable rail includes an angled bottom end portion, which, with said foldable rail in said upraised position, engages said angled rest and said first flange, whereby said foldable rail is supported and locked in said upraised position, and said foldable rail, when in said lowered position, engages said angled rest and said second flange, whereby said foldable rail is supported in said lowered position.

10. The cement mixing truck of claim 4 comprising a plurality of said foldable rails adapted to be repositioned between said locked upraised position and said lowered position.

11. The cement mixing truck of claim 10, wherein said plurality of foldable rails are pivotally attached to said stationary support, and at least one hinge is mounted intermediate said stationary support and each foldable rail.

12. The cement mixing truck of claim 4, comprising two foldable rails forming a corner when in said upraised position, said foldable rails foldable inwards toward said platform to said lowered position.

13. The cement mixing truck of claim 1, comprising a position locking mechanism connected to said safety rail and locking said repositionable portion in said locked upraised position.

14. The cement mixing truck of claim 13, wherein said position locking mechanism comprises a stop, said repositionable portion engages said stop when in said locked upraised position and is foldable inwards toward said platform to said lowered position, and in said lowered position, said repositionable portion includes a second portion that is spaced from said platform, thereby making the area of said platform directly underneath said repositionable portion substantially inaccessible to persons.

15. The cement mixing truck of claim 13, wherein said position locking mechanism comprises a bracket having a first flange, a second flange, and an angled rest, said repositionable portion has an angled bottom end portion, which, with said repositionable portion in said upraised position, engages said angled rest and said first flange, whereby said repositionable portion is supported and locked in said upraised position, and said repositionable portion, when in said lowered position, engages said angled rest and said second flange, whereby said repositionable portion is supported in said lowered position.

16. The cement mixing truck of claim 13, wherein said position locking mechanism comprises an over-center type lock, whereby said repositionable portion, when raised to an extended vertical position, may be lowered axially downward into said locked upraised position.

17. The cement mixing truck of claim 1 further comprising a toe board extending upward from said platform and adjacent said safety rail.

18. The cement mixing truck of claim 17, wherein said toe board extends upward at least four inches from said platform.

19. The cement mixing truck of claim 1, wherein said safety rail extends upward at least 42 inches from said platform when in said locked upraised position.

20. A cement mixing tack comprising:
   a mixing drum having an opening for receiving products to be mixed and rotationally mixing the products to be mixed into concrete;
   a mixing product receiving and delivery assembly including a charge hopper adjacent said opening for receiving the mixing products, and a collection hopper for delivering mixed concrete;
   an elevated platform in close proximity with said mixing product receiving and delivery assembly; and
   a safety rail partially enclosing said platform and having a portion repositionable between a locked upraised position and a lowered position, whereby with said safety rail in said locked upraised position a person occupying said platform is provided a measure of safety and with said safety rail in said lowered position said mixing product receiving and delivery assembly is unobscured and accessible.

21. A cement mixing truck having a mixing drum, a mixing product receiving and delivery assembly connected to said mixing drum, an elevated platform adjacent said mixing product receiving and delivery assembly, and a safety rail partially enclosing said platform and comprising:
   a foldable rail movably attached to said platform; and
   means for repositioning and locking said foldable rail disposed intermediate said platform and said foldable rail, whereby said foldable rail may be repositioned with respect to said platform from an upraised position to a lowered position, with said foldable rail in said lowered position said mixing product receiving and delivery assembly being unobscured and accessible.

22. The cement mixing truck of claim 21, wherein in said upraised position said foldable rail is substantially vertical and in said lowered position said foldable rail is substantially horizontal.

23. The cement mixing truck of claim 21, wherein said repositioning and locking means comprises a hinge for pivoting said foldable rail between said upraised position and said lowered position.

24. The cement mixing truck of claim 21, wherein said repositioning and locking means comprises a pivoting means, and a stop, said foldable rail engages said stop when in said upraised position and is foldable inwards toward said platform to said lowered position, and in said lowered position, a portion of said foldable rail is spaced from said platform, thereby making the area of said platform directly underneath said foldable rail substantially inaccessible to persons.

25. The cement mixing truck of claim 24 further comprising a stationary support intermediate said platform and said foldable rail, wherein said pivoting means comprises a fixed member which is attached to one of said stationary support and said foldable rail, and a slot in the other of said stationary support and said foldable rail for slidably receiving said fixed member.

26. The cement mixing track of claim 21, wherein said repositioning and locking means comprises a pivoting means and a bracket having a first flange, a vertical flange, and an angled rest, said foldable rail has an angled bottom end, which, with said foldable rail in said upraised position, engages said angled rest and said first flange, whereby said foldable rail is supported in said upraised position, and said foldable rail, when in said lowered position, engages said angled rest and said second flange, whereby said foldable rail is supported in said lowered position.

* * * * *

UNITED STATES PATENT AND TRADEMARK OFFICE
CERTIFICATE OF CORRECTION

PATENT NO. : 5,676,460

DATED : October 14, 1997

INVENTOR(S) : Daniel S. Biberstine, Paul C. Ellingen, and Steven K. Igney

It is certified that error appears in the above-identified patent and that said Letters Patent is hereby corrected as shown below:

Claim 20, Col. 7, Line 4, delete "tack" and insert --truck--.

Signed and Sealed this

Third Day of February, 1998

BRUCE LEHMAN

*Attest:*

*Attesting Officer*          *Commissioner of Patents and Trademarks*